J. C. McLEAN.
ANTISLIPPING DEVICE FOR WHEELS.
APPLICATION FILED FEB. 14, 1912.
1,110,331. Patented Sept. 15, 1914.
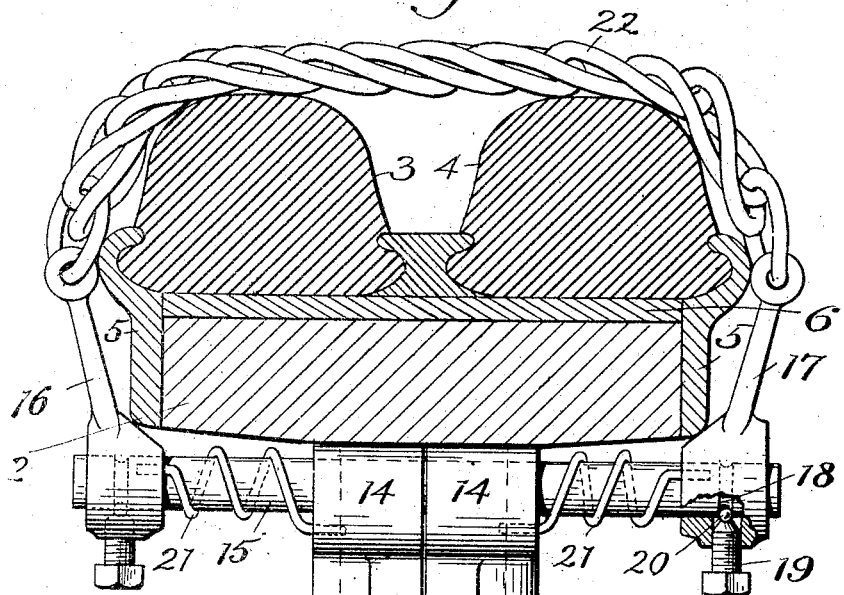
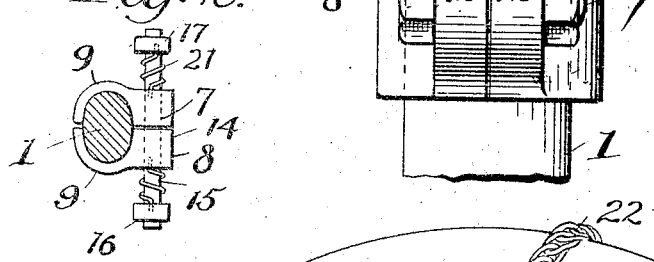
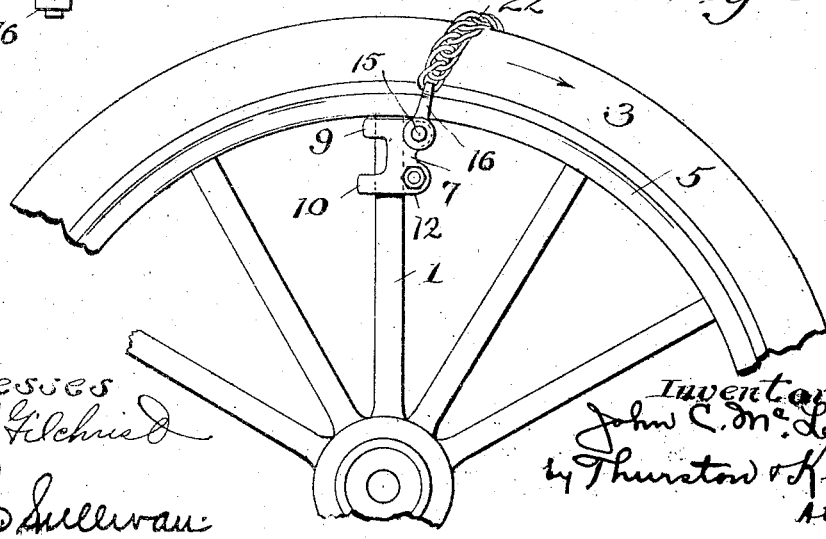

UNITED STATES PATENT OFFICE.

JOHN C. McLEAN, OF LAKEWOOD, OHIO.

ANTISLIPPING DEVICE FOR WHEELS.

1,110,331.  Specification of Letters Patent.  Patented Sept. 15, 1914.

Application filed February 14, 1912.  Serial No. 677,517.

*To all whom it may concern:*

Be it known that I, JOHN C. McLEAN, a citizen of the United States, residing at Lakewood, in the county of Cuyahoga and State of Ohio, have invented a certain new and useful Improvement in Antislipping Device for Wheels, of which the following is a full, clear, and exact description.

This invention relates to devices for use upon vehicle wheels to prevent the skidding of the wheels and in general to provide traction between the wheels and ground, when traction is needed. More particularly the device is intended for use upon the heavier rubber tired vehicles, as motor trucks, and the object is to provide a traction device of simple construction and at the same time secure the strength necessary to withstand the strains to which the device is subjected, and further to provide a device which will not cut the tire upon which it is used.

Generally speaking, the invention comprises the elements and combinations thereof set forth in the accompanying claims.

Reference should be had to the accompanying drawings forming a part of this specification in which—

Figure 1 is a sectional elevation of a portion of a wheel spoke, rim and tire, showing the traction device secured thereto; Fig. 2 is a reduced horizontal section through a spoke and the support or clamp for the device; Fig. 3 is a side elevation of a wheel showing one of the devices in position.

The device herein shown is adapted for use upon various types of wheels and tires, but for purposes of illustration, the drawing discloses the same in use with a double solid tire tread, although it will be apparent that a single tread tire may use the device with equal facility.

Heretofore when using individual cross chains extending around a tire for the purpose of producing traction, it has been the usual practice to fasten the ends of each chain in such manner that the chain is held tight against the tire and has very limited movement along the tread.

The traction device of this invention comprises a chain extending transversely of the tire, the chain being so mounted that normally it occupies a position upon the tire in advance of its fastening points, and when the wheel is moving and the chain is in action between wheel and road, the chain may have a free movement over a limited portion of the tread of the tire, and after the chain has left the road, it is again thrown forward upon the tire as at first described.

The spoke of the wheel is represented at 1, and the rim at 2. Upon the rim are the tires 3 and 4, the same being held in position by means of the metal side plates 5, and the base plate 6. These plates are formed with projecting flanges which engage with recesses formed in the base of the tires, all of which construction is old and well known.

Fastened upon the spoke 1, is a support or two-part clamp comprising members 7 and 8. These members 7 and 8 are formed with projecting arms 9 and 10 which extend around the spoke. Each of the members 7 and 8 is formed with a boss 12, the same being provided with an opening, and through the alined openings of the bosses upon the members 7 and 8 extends suitable securing means, such as a bolt, represented at 13. Above the boss 12 is another boss 14, through which is an opening. The bosses upon the members 7 and 8 have the openings therethrough in alinement, and the opening in the bosses 14 provides a journal for a short shaft 15. This shaft extends beyond the bosses and upon the ends there are mounted removable arms 16 and 17. Means are provided for securing the arms against slipping off of the ends of the shaft, this means being such as to permit the rotation of the arms upon the shaft. As an illustration of such means, I have shown the shaft 15 as provided with grooves 18. Through the portion of the arm 16 surrounding the shaft, there is an opening in which is mounted a set screw 19. The set screw is formed with a spherical cavity at the end thereof, and within the cavity is a ball 20, the ball being fixed within the groove 18 when the set screw 19 is tightened. This construction prevents the arm 16 from moving off the ends of the shaft, at the same time permitting the arms to rotate about the shaft.

Surrounding the shaft 15 upon the opposite sides of the bosses 14 are springs 21. These springs are coiled upon the shaft, and their opposite ends are secured upon the bosses 14 and the arms 16 and 17. The springs are under such tension that they throw the outer ends of the arms 16 and 17 into a position in advance of the pivotal axis upon which they are mounted, and when the device is placed upon a vehicle wheel, it is placed in such position that the arms are advanced in the direction in which the vehicle wheel is to move, when moved in its normal forward direction.

Upon the ends of the arms there is secured the opposite ends of a chain 22, the chain extending across or transversely of the tire. The chain herein shown is a double strand interlinked chain, and such a chain will never present a row of link edges to the tire. That is to say, there will always be a plurality of links in engagement with the tire, and thereby prevent the cutting of the tire by the chains, as would be the case if a single strand chain were used.

The levers 16 and 17 are usually spaced so that they lie against or near the sides of the felly of the wheel. In this way, when a strain comes upon the chain, which would tend to bend the arms 16 and 17, this strain is in part borne by the felly of the wheel because of the contact between the arms and the felly.

Under the action of the spring, the chain is always thrown forward in the direction in which the wheel is rotating, and the action is such that the chain is normally held upon the tire of the wheel, as is clearly shown in Fig. 3. When the wheel is running over a road and the traction between the tire and the road is sufficient to propel the vehicle, the chains really perform no function. When, however, the traction between the tire and road is not sufficient and there is a tendency toward slipping, then when a chain passes between the wheel and vehicle, the chain furnishes the necessary traction. Under such circumstances, the chain usually moves from its position, as shown in Fig. 3, to a position somewhat in the rear of that shown. This movement is permitted by the turning of the arms 16 and 17 upon the shaft 15 against the action of the spring 21. When, however, the chain has passed from between the contact with the tire and the road, the chain is thrown forward to again occupy the position as shown in Fig. 3.

In practice, a number of these traction devices will be used upon a wheel, and it will thus be seen that a single chain is subjected to the strain incident to producing the traction between the road and the wheel, only for a short period of time, and further that the chain while producing the traction, may move against the resisting action of the spring and in this manner the strain is considerably reduced.

Attention is called to the action of the chain upon the tire in that it has practically no cutting action. The chain is not held in a single position upon the tire, and although the springs will throw the chain to a forward position each time they act, yet the chain always moves more or less from this position upon the tire, against the action of the springs, when the chain is in contact with the road. It is this fact, that each chain when in action may move over a fair sized portion of the tire tread and is not confined or held to a single position, which gives it this particular advantage.

It will be apparent that modifications may be made of the precise structure herein shown, without departing from the spirit of the invention.

Having thus described my invention, what I claim is:

1. In a traction device for vehicle wheels, the combination with a chain adapted to extend transversely over the tire, and means for securing the ends of the chain upon the wheel, said chain being of greater length than the transverse length of the tire, whereby the chain may be moved along a restricted portion of the tread of the tire when the chain is between the wheel and the road, of means operatively connected with the chain and the wheel acting to throw the chain forward upon the tire in the direction of rotation of the tire when the chain passes from between the road and the tire.

2. In a traction device for vehicle wheels, the combination of the chain extending transversely of the tire, means for securing the ends of the chain upon the wheel, of resilient means operatively connected to the chain and the wheel, the said chain being of greater transverse length than the tire whereby the chain may be moved against the action of the resilient means along a restricted portion of the tread of the wheel when the chain is between the wheel and the road, the said resilient means acting to throw the chain forward upon the tire in the direction of the rotation of the wheel when the chain passes from between the wheel and the road.

3. In a traction device for vehicle wheels, the combination with a support adapted to be secured upon a portion of the wheel and a chain passing over the tire transversely thereof, means for securing opposite ends of the chain to the support, of means operatively connected with the chain and wheel for normally urging the chain forward upon the tire of the wheel in the normal direction of rotation of the wheel.

4. In a traction device for vehicle wheels, the combination with a support adapted to be secured upon a portion of the wheel, a chain passing over the tire transversely thereof, means for securing the opposite ends of the chain to the support, of resilient means operatively connected with the chain and the support and normally urging the chain forward upon the tire of the wheel in the normal direction of rotation of the wheel.

5. In a traction device for use upon vehicle wheels, the combination with a chain extending transversely of the tire, means for securing the ends of the chain upon the wheel, of a spring operatively secured to the chain and wheel, said chain being of greater length than the transverse length of the tire whereby the chain may be moved against the action of the spring along a restricted portion of the tread of the wheel when the chain is between the wheel and the road, said spring acting to throw the chain forward upon the tire in the direction of rotation of the tire when the chain passes from between the wheel and road.

6. In a traction device for use upon vehicle wheels, the combination with a support adapted to be secured upon the wheel, a chain passing over the tire transversely thereof and of greater length than the transverse length of the tire, arms to which the ends of the chain are connected mounted upon the said support, said arms being free to move in a plane parallel with the plane of the wheel, a spring operatively connected to one of said arms and to the support, substantially as described.

7. A traction device for use upon vehicle wheels comprising a support adapted to be secured upon the wheel, a shaft carried by said support, arms mounted upon the said shaft, means for securing said arms to the shaft so that the arms may rotate upon the shaft, a spring surrounding the shaft and secured to the support and the arms, a chain extending across the tire transversely thereof, the opposite end of said chain being secured to the said arms.

8. In a traction device for vehicle wheels, the combination of a chain extending transversely of the tire, means for securing the ends of the chain upon the wheel, of torsionally actuated means to throw the chain forward upon the tire in the direction of forward rotation thereof operatively connected to the chain and the wheel, the said chain being of greater transverse length than the tire, whereby the chain is normally caused to engage the tire ahead of the position occupied when the chain is acted upon by centrifugal force alone.

9. In a traction device for use upon vehicle wheels, the combination of a chain extending transversely of the tire, arms pivoted in the plane of the wheel and rotatable bodily with said wheel, a chain secured to said arms, and means for normally holding and returning said arms to a given angular position relative to the wheel.

In testimony whereof, I hereunto affix my signature in the presence of two witnesses.

JOHN C. McLEAN.

Witnesses:
A. J. HUDSON,
H. R. SULLIVAN.